(12) United States Patent
Koike et al.

(10) Patent No.: US 10,116,439 B2
(45) Date of Patent: Oct. 30, 2018

(54) ENCRYPTED DATA COMPUTATION SYSTEM, DEVICE, AND PROGRAM

(71) Applicants: KABUSHIKI KAISHA TOSHIBA, Minato-ku (JP); TOSHIBA SOLUTIONS CORPORATION, Kawasaki-shi (JP)

(72) Inventors: Masanobu Koike, Tama (JP); Ryotaro Hayashi, Hiratsuka (JP); Tatsuyuki Matsushita, Tokyo (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 345 days.

(21) Appl. No.: 14/851,684

(22) Filed: Sep. 11, 2015

(65) Prior Publication Data

US 2016/0006563 A1    Jan. 7, 2016

Related U.S. Application Data

(63) Continuation of application No. PCT/JP2014/055139, filed on Feb. 28, 2014.

(30) Foreign Application Priority Data

Mar. 13, 2013    (JP) ................. 2013-051001

(51) Int. Cl.
*H04L 9/08* (2006.01)
*H04L 9/30* (2006.01)
(Continued)

(52) U.S. Cl.
CPC ............ *H04L 9/0816* (2013.01); *H04L 9/302* (2013.01); *H04L 9/14* (2013.01); *H04L 63/0428* (2013.01); *H04L 2209/46* (2013.01)

(58) Field of Classification Search
USPC ....................................................... 713/168
See application file for complete search history.

(56) References Cited

U.S. PATENT DOCUMENTS

| | | | |
|---|---|---|---|
| 2005/0201555 A1* | 9/2005 | Yen ...................... | H04L 9/3218 380/30 |
| 2011/0007894 A1 | 1/2011 | Takenaka et al. | |
| 2013/0230168 A1* | 9/2013 | Takenouchi ........ | G06F 21/6209 380/46 |

FOREIGN PATENT DOCUMENTS

| | | |
|---|---|---|
| CN | 102135871 A | 7/2011 |
| JP | 2009-129292 A | 6/2009 |
| WO | WO 2012/067214 A1 | 5/2012 |

OTHER PUBLICATIONS

Peng et al. Ciphertext Comparison, a New Solution to the Millionaire Problem, Dec. 2005, Information security Institute Queensland University of Technology, pp. 1-18.*

(Continued)

*Primary Examiner* — Brandon Hoffman
*Assistant Examiner* — Samuel Ambaye
(74) *Attorney, Agent, or Firm* — Oblon, McClelland, Maier & Neustadt, L.L.P.

(57) ABSTRACT

According to one embodiment, an encryption device encrypts each of numerical values based on an encryption key, and generates encrypted data. On the basis of each of the encrypted data, a computation device generates a primary computation result corresponding to data in which a computation result of an expression that has added and subtracted each of the numerical values is encrypted. On the basis of the primary computation result, a secondary computation key and random numbers, a computation assist device generates a secondary computation result. The computation device generates a tertiary computation result based on the secondary computation result and a tertiary compu- (Continued)

tation key, and decides the magnitude relation between a minuend and a subtrahend in the expression based on the tertiary computation result.

9 Claims, 8 Drawing Sheets

(51) Int. Cl.
*H04L 9/14* (2006.01)
*H04L 29/06* (2006.01)

(56) References Cited

OTHER PUBLICATIONS

International Search Report dated Mar. 25, 2014 in PCT/JP2014/055139 filed Feb. 28, 2014 with English translation.
Written Opinion dated Mar. 25, 2014 in PCT/JP2014/055139 filed Feb. 28, 2014.
Office Action dated Mar. 10, 2015 in Japanese Patent Application No. 2013-051001, with English translation.
Hidetoshi Utsunomiya, et al., "Pairing o Mochiita Daisho Hikaku no Hitoku Keisan no Ichi Shuho" "A Method of Secrecy Calculation of Large and Small Comparison by Using Pairing" Dai 73 Kai, (Heisei 23 Nen) Zenkoku Taikai Koen Ronbunshu (3), Proceedings of the 73th (2011) Annual Convention IPS Japan (3), Network Security, Mar. 2, 2011, pp. 3-471 to 3-472.
Koji Chida, et al., "On a Secure Function Evaluation for Comparator Networks" IEICE Technical Report, vol. 106, No. 599, Mar. 9, 2007, pp. 53-58.
Masanobu Koike, et al., "An Attack on Homomorphic Encryption Scheme Supporting Comparison", $29^{th}$ Symposium on Cryptography and Information Security, Encryption and Information Security Symposium Proceedings, Jan. 30, 2012, pp. 1-8.
Florian Kerschbaum, et al., "Performance Comparison of Secure Comparison Protocols", $20^{th}$ International Workshop on Database and Expert Systems Application, IEEE, 2009, pp. 133-136.
Kun Peng, et al. "Ciphertext Comparison, a New Solution to the Millionaire Problem" Information and Communications Security, Dec. 10-13, 2005, 18 Pages.
Combined Chinese Office Action and Search Report dated Aug. 22, 2016 in Patent Application No. 201480010808.6 (with English language translation).

* cited by examiner

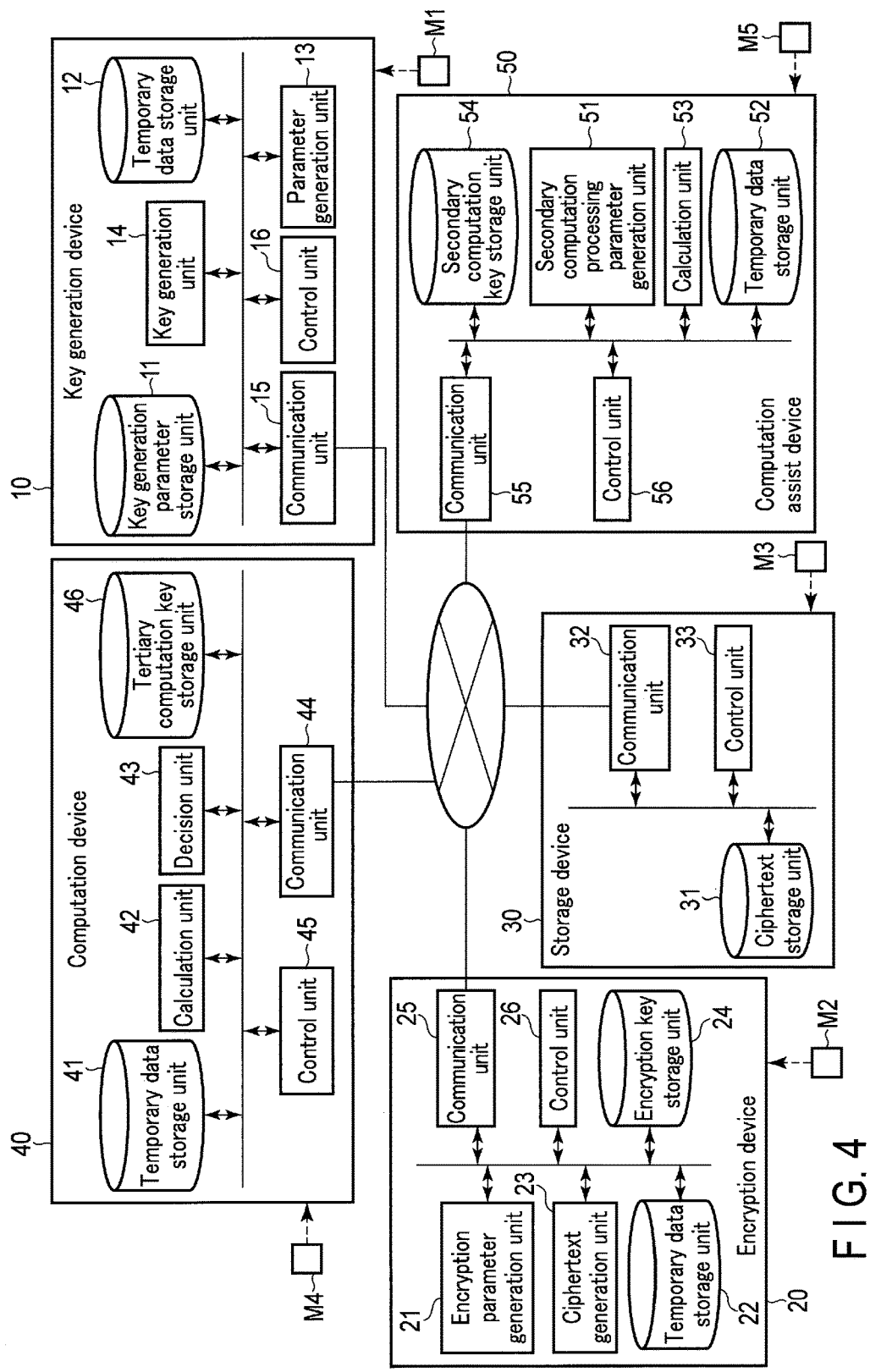
F I G. 4

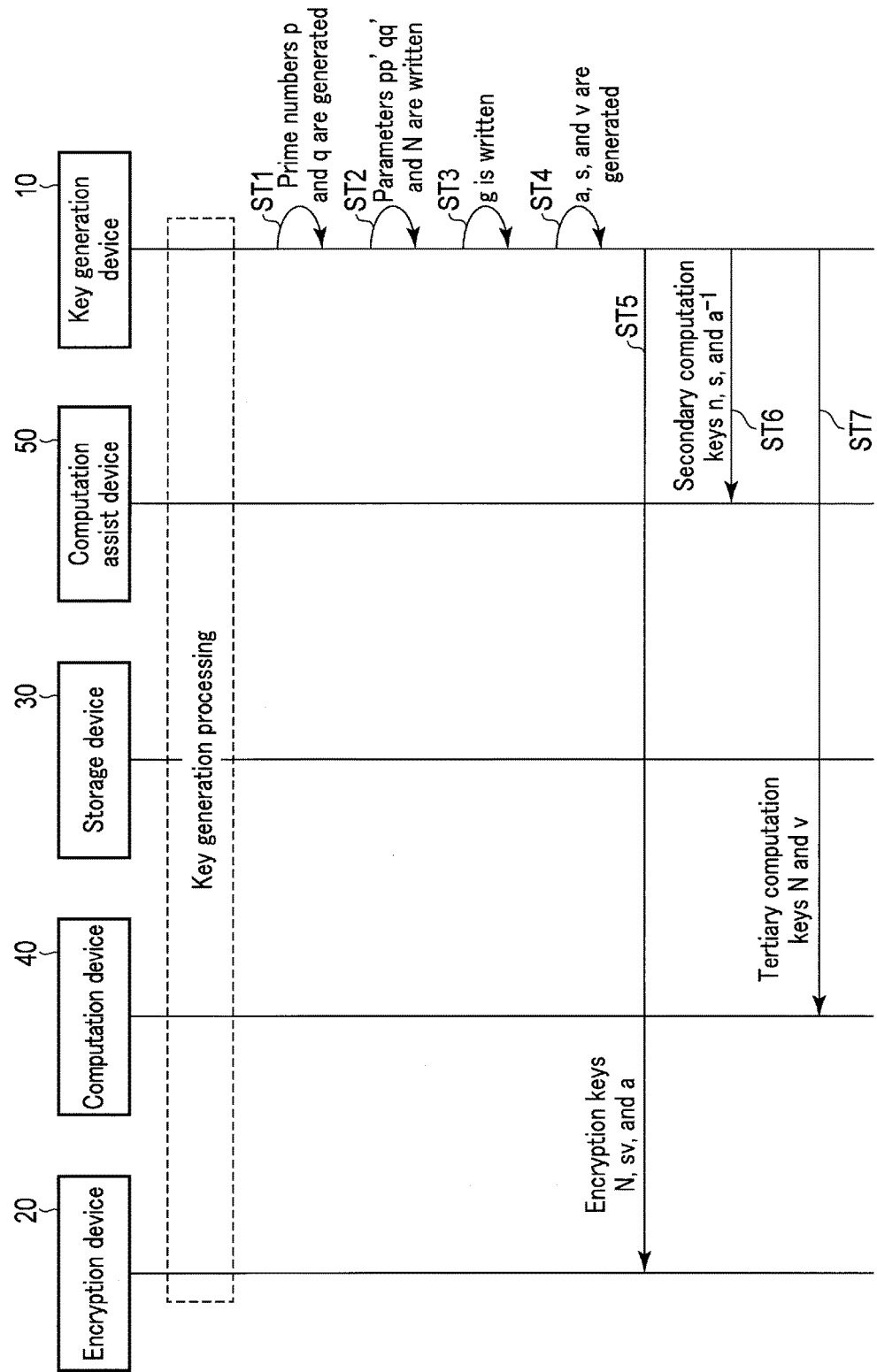
F I G. 5

ENCRYPTED DATA COMPUTATION SYSTEM, DEVICE, AND PROGRAM

CROSS-REFERENCE TO RELATED APPLICATIONS

This application is a Continuation Application of PCT application No. PCT/JP2014/055139, filed on Feb. 28, 2014, and is based upon and claims the benefit of priority from Japanese Patent Application No. 2013-051001, filed on Mar. 13, 2013, the entire contents of all of which are incorporated herein by reference.

FIELD

Embodiments of described herein relate generally to an encrypted data computation system, a device, and a program.

BACKGROUND

Numerical values a and b are encrypted, and encrypted data E(a) and E(b) are obtained. There has been known a magnitude comparison method of comparing the magnitudes of the numerical values a and b on the basis of the encrypted data E(a) and E(b) without decrypting the encrypted data E(a) and E(b).

In this type of magnitude comparison method, first, a certain entity A selects a random number r, and calculates encrypted data E(r(a−b)) on the basis of the random number r and the encrypted data E(a) and E(b). Other (e.g., three) entities B, C, and D separately hold decryption keys for decrypting the encrypted data E(r(a−b)).

The other entities B, C, and D bring the separated decryption keys, and decrypt the encrypted data E(r(a−b)) on the basis of the brought decryption keys. The magnitude relation between the numerical values a and b is decided by the positive or negative of the decryption result r(a−b). In this magnitude comparison method, the decryption key necessary for magnitude comparison is also referred to as a comparison key.

Meanwhile, the above magnitude comparison method normally has no problem, but cannot add and subtract each numerical value (e.g., E(3a+b−4c)) by using each of the encrypted data E(a), E(b), E(c), . . . , according to the examination by the present inventor. Thus, it is not possible to decide the magnitude relation between a minuend (e.g., 3a+b) and a subtrahend (e.g., 4c) in this addition-subtraction.

An object of the present invention is to provide an encrypted data computation system, a device, and a program which can add and subtract each numerical value by using each encrypted data obtained by encrypting each numerical value and which can decide the magnitude relation between a minuend and a subtrahend in this addition-subtraction.

BRIEF DESCRIPTION OF THE DRAWINGS

FIG. 4 is a schematic diagram showing the configuration of each device according to the same embodiment;

FIG. 5 is a sequence diagram illustrating the operation of key generation processing according to the same embodiment;

DETAILED DESCRIPTION

Figure 1:
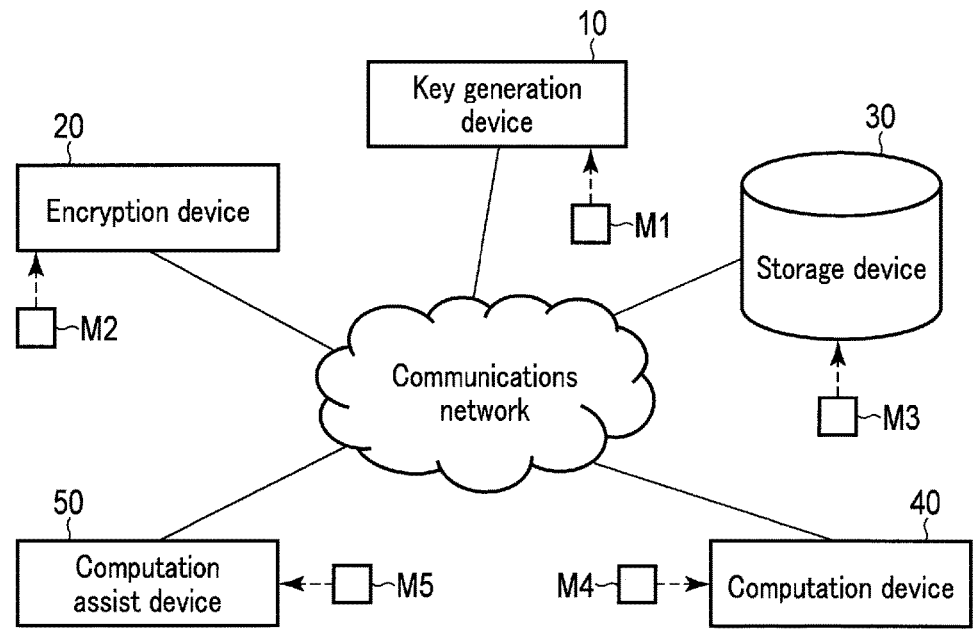
FIG. 1 is a schematic diagram showing a configuration example of an encrypted data computation system according to a first embodiment.

In general, according to one embodiment, a encrypted data computation system includes a client terminal, a computation device, and a computation assist device.

The client terminal includes a numerical value storing circuit, a key generating circuit, and an encryption circuit.

The numerical value storing circuit stores numerical values.

The key generating circuit generates an encryption key to encrypt each of the numerical values, and a secondary computation key and a tertiary computation key that constitute a decryption key corresponding to the encryption key.

The encryption circuit encrypts each of the numerical values on the basis of the encryption key, and generates encrypted data.

The computation device includes a tertiary computation key storing circuit, a primary computation circuit, a tertiary computation circuit, and a magnitude deciding circuit.

The tertiary computation key storing circuit stores the tertiary computation key.

The primary computation circuit executes primary computation processing on the basis of each of the encrypted data, and thereby generates a primary computation result corresponding to data in which a computation result of an expression that has added and subtracted each of the numerical values is encrypted.

The tertiary computation circuit executes tertiary computation processing on the basis of a secondary computation result and the tertiary computation key when the secondary computation result in which the primary computation result is randomized is generated by the computation assist device, and thereby generates a tertiary computation result corresponding to data in which the computation result of the expression that has performed the addition-subtraction is kept secret by random numbers alone.

The magnitude deciding circuit decides the magnitude relation between a minuend and a subtrahend in the expression on the basis of the tertiary computation result.

The computation assist device includes a secondary computation key storing circuit, a random number generating circuit, and a secondary computation circuit.

The secondary computation key storing circuit stores the secondary computation key.

The random number generating circuit generates the random numbers.

The secondary computation circuit executes secondary computation processing on the basis of the primary computation result, the secondary computation key, and the random numbers, and thereby generates the secondary computation result.

Hereinafter, each embodiment will be described with reference to the drawings. It is to be noted that each device described below can be obtained by a hardware configuration or by a combinational configuration of hardware resources and software. A program used as the software of the combinational configuration is previously installed on a computer from a network or from a non-transitory computer-readable storage medium M1 to M5, M2', M4', or M5', and is executed by a processor of the computer to cause the computer to achieve the function of the corresponding device.

First Embodiment

Initially, a configuration example of an encrypted data computation system according to the present embodiment is described with reference to FIG. 1. The encrypted data computation system comprises a key generation device 10, an encryption device 20, a storage device 30, a computation device 40, and a computation assist device 50.

Here, the key generation device 10, the storage device 30, the computation device 40, and the computation assist device 50 are information processing devices of a service provider that provides service.

The encryption device 20 is an information processing device of a user who uses the service. The devices 10, 20, 30, 40, and 50 are connected to be able to communicate with one another via a communications network.

Figure 2:
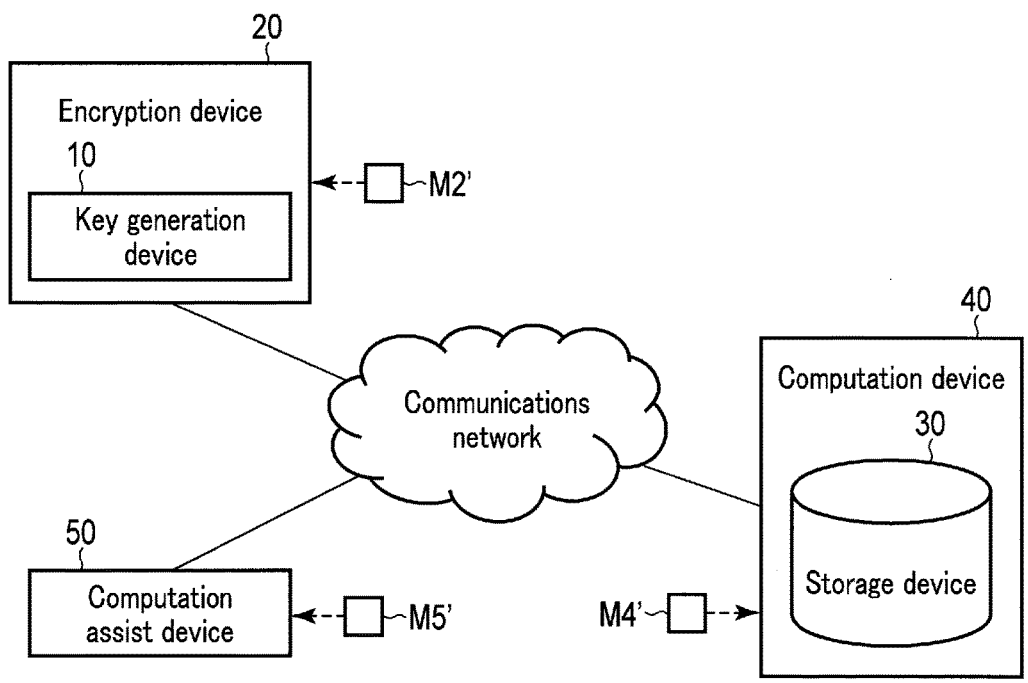
FIG. 2 is a schematic diagram showing another configuration example of the encrypted data computation system according to the same embodiment.

The communications network is, for example, a wireless local area network (LAN), a wired LAN, an optical line network, a telephone line network, an intranet, an Ethernet™, and the Internet, or a combination of the above. Although only one device is shown as each of the devices connected to the encrypted data computation system in FIG. 1, each of the devices may include more than one device. Although each of the devices is independently connected to the encrypted data computation system in the example shown in FIG. 1, the invention is not limited to this, and more than one device may be included in one information processing device. For example, as shown in FIG. 2, the key generation device 10 and the encryption device 20 may be included in one client terminal (not shown). Moreover, for example, although not shown, the storage device 30 and the computation device 40 may be included in one server device.

Figure 3:
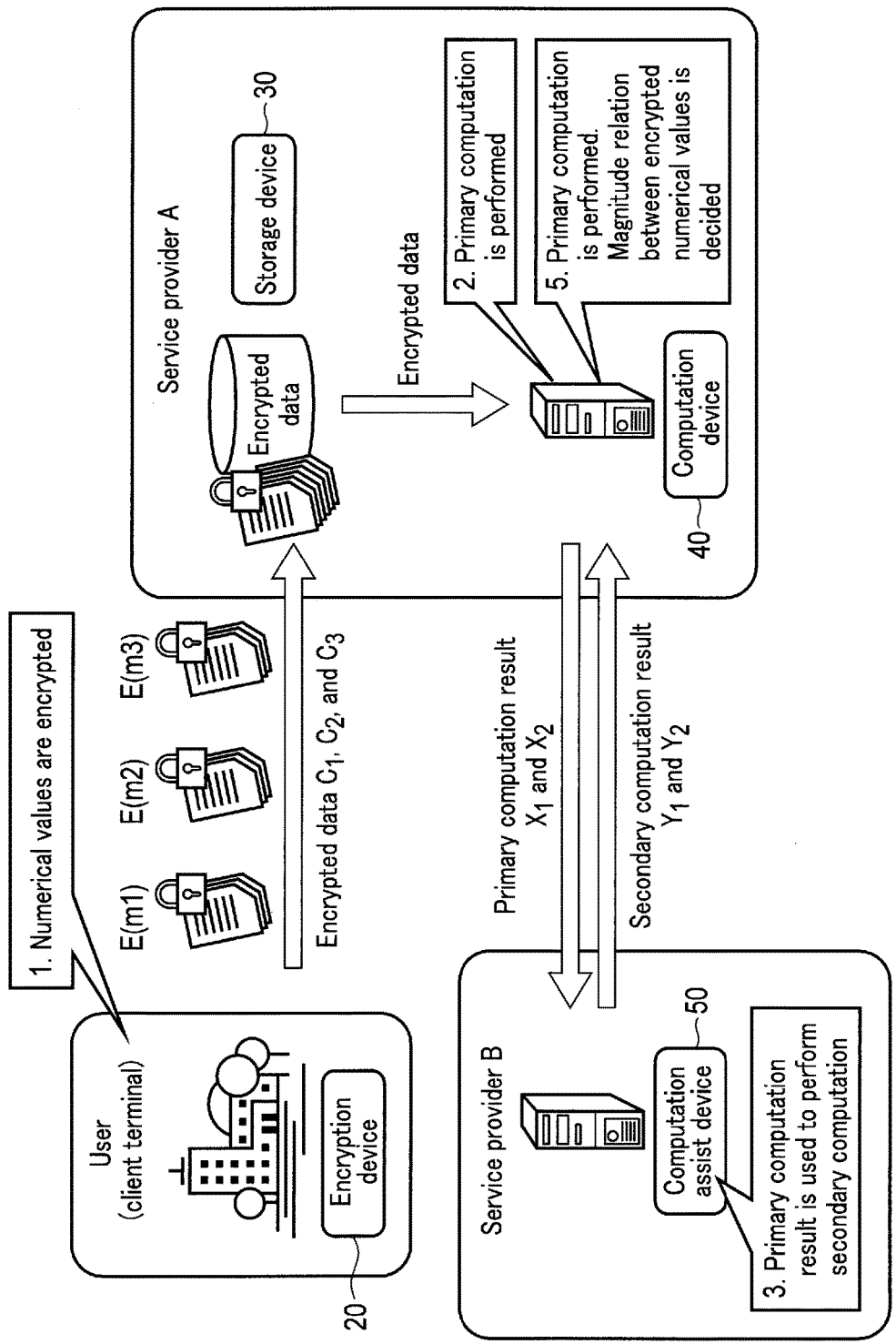
FIG. 3 is a schematic diagram showing an overview of the encrypted data computation system according to the same embodiment.

FIG. 3 is a schematic diagram showing the overview of the encrypted data computation system. This encrypted data computation system comprises a user, a service provider A, and a service provider B. Although the key generation device 10 is not shown in FIG. 3, the key generation device 10 may be held by a reliable third party or may be held by the user.

The user encrypts, in the encryption device 20, a numerical value $m_i$ (i=1, 2, 3, . . . ) by using an encryption key generated in the key generation device 10. The user then sends generated encrypted data $E(m_i)$ to the service provider A.

The service provider A stores the received encrypted data $E(m_i)$ in the storage device 30. The service provider A acquires the encrypted data $E(m_i)$ (necessary for primary computation processing) from the storage device 30, and performs the primary computation processing in the computation device 40. The service provider A sends a primary computation processing result to the service provider B.

A key generated in the key generation device 10 to perform a secondary computation (hereinafter referred to as a secondary computation key) is previously handed to the service provider B. The service provider B performs the secondary computation processing in the computation assist device 50 by using the received primary computation processing result and the previously handed secondary computation key. The service provider B sends a secondary computation processing result to the service provider A.

A key generated in the key generation device 10 to perform a tertiary computation (hereinafter referred to as a tertiary computation key) is previously handed to the service provider A. The service provider A performs the tertiary computation processing in the computation device 40 by using the received secondary computation processing result and the previously handed tertiary computation key. Finally, the service provider A sends a tertiary computation processing result to the user. The service provider A may send, to the user, the result of further performing computation processing for tertiary computation processing results which are obtained by repeating the above-described processing more than one time.

Which entity holds which device is not limited to the example described above, and variations are applicable.

The configurations of the key generation device 10, the encryption device 20, the storage device 30, the computation device 40, and the computation assist device 50 are next specifically described with reference to FIG. 4.

The key generation device 10 comprises a key generation parameter storage unit 11, a temporary data storage unit 12, a parameter generation unit 13, a key generation unit 14, a communication unit 15, and a control unit 16.

Here, the key generation parameter storage unit 11 is a storage device to store a key generation parameter. As the key generation parameter, it is possible to use, for example, a security parameter λ to determine the lower limit of the number of bits of a composite number N=pq regarding key generation.

The temporary data storage unit 12 is a storage device to store numerical values to be computed, and temporary data which is being processed and which is a processing result in each of the generation units 13 and 14.

The parameter generation unit 13 generates a parameter for key generation.

The key generation unit 14 generates an encryption key (e.g., a and sv), a secondary computation key (e.g., $a^{-1}$ and s), and a tertiary computation key (e.g., v). The encryption key is a key to encrypt each numerical value. The secondary computation key and the tertiary computation key constitute a decryption key (e.g., $a^{-1}$, s, and v) corresponding to the encryption key.

The communication unit 15 is a communication interface to communicate with the other devices 20 to 50, and, for example, has a function to respectively send the secondary computation key and the tertiary computation key in the temporary data storage unit 12 to the computation assist device 50 and the computation device 40 under the control of the control unit 16. In the explanation below, the intervention of the communication unit 15 at the time of sending and receiving may not be mentioned to avoid redundant description for sending and receiving. The same also applies to the communication units 25, 32, 44, and 55 of the other devices 20 to 50.

The control unit 16 has a function to control each of the units 11 to 15 to perform the operation shown in FIG. 5.

The encryption device 20 comprises an encryption parameter generation unit 21, a temporary data storage unit 22, a ciphertext generation unit 23, an encryption key storage unit 24, the communication unit 25, and a control unit 26.

Here, the encryption parameter generation unit 21 generates an encryption parameter. As the encryption parameter, it is possible to use, for example, k random numbers $r_1, \ldots,$ and $r_k$ randomly selected from a set $Z_N2$ of integers less than or equal to 0 and less than $N^2$.

The temporary data storage unit 22 is a storage device to store temporary data which is being processed and which is a processing result in each of the generation units 21 and 23.

The ciphertext generation unit 23 decrypts each numerical value on the basis of the decryption key, and generates more than one ciphertext (more than one encrypted data).

The encryption key storage unit 24 is a storage device to store the decryption key.

The communication unit 25 is a communication interface to communicate with the other devices 10, and 30 to 50, and has, for example, a function to send the ciphertexts in the temporary data storage unit 22 to the storage device 30 under the control of the control unit 26.

Figure 6:
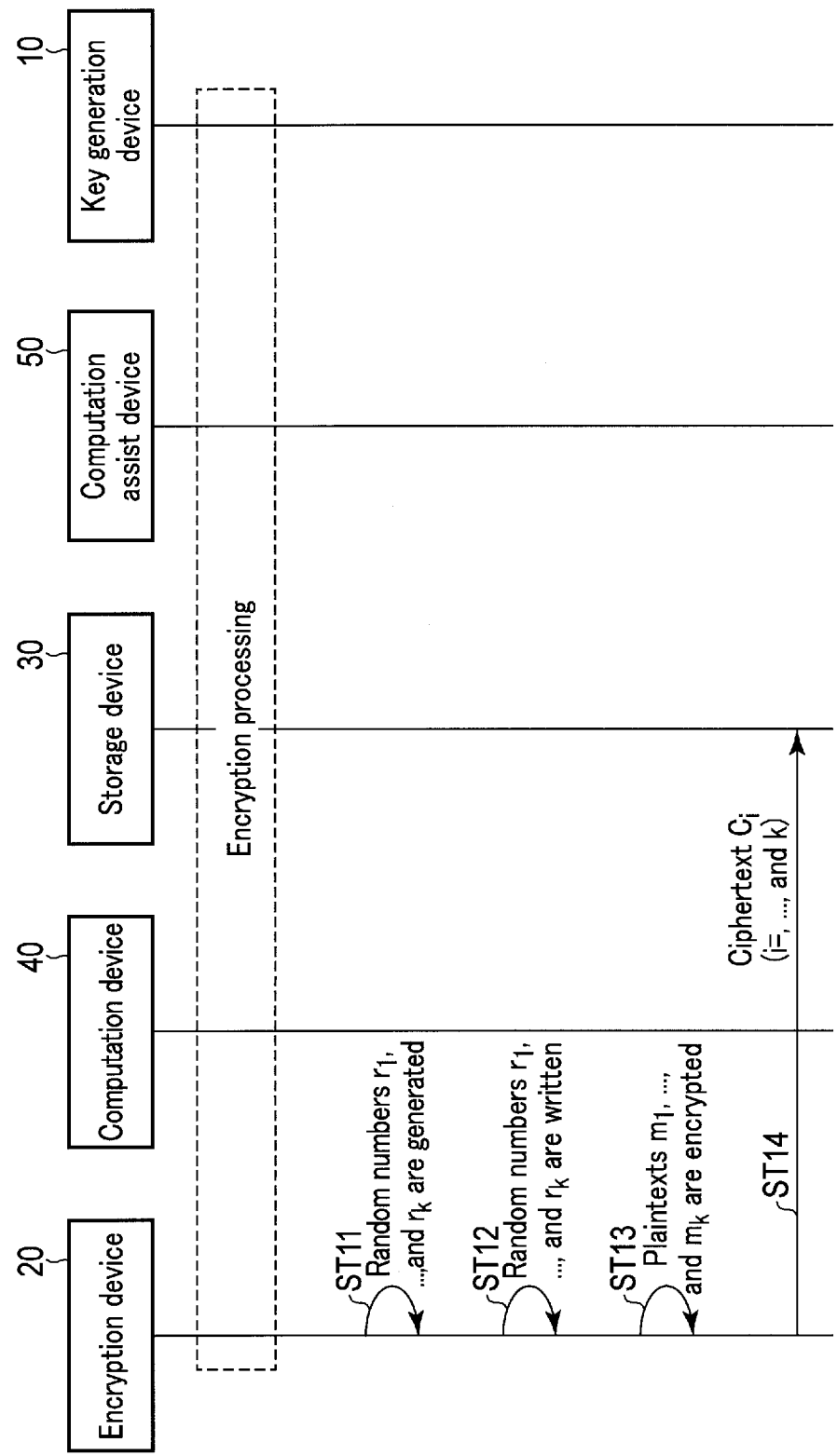
FIG. 6 is a sequence diagram illustrating the operation of encryption processing according to the same embodiment.

The control unit 26 has a function to control each of the units 21 to 25 to perform the operation shown in FIG. 6.

The storage device 30 comprises a ciphertext storage unit 31, the communication unit 32, and a control unit 33.

Here, the ciphertext storage unit 31 is a storage device to store the ciphertexts.

The communication unit 32 is a communication interface to communicate with the other devices 10, 20, 40, and 50, and has, for example, a function to send the ciphertexts in the ciphertext storage unit 31 to the computation device 40 under the control of the control unit 33.

The control unit 33 has a function to control each of the units 31 and 32.

The computation device 40 comprises a temporary data storage unit 41, a calculation unit 42, a decision unit 43, the communication unit 44, a control unit 45, and a tertiary computation key storage unit 46.

Here, the temporary data storage unit 41 is a storage device to store temporary data which is being processed and which is a processing result in the calculation unit 42 and the decision unit 43.

The calculation unit 42 calculates a primary computation result and a tertiary computation result. Specifically, the calculation unit 42 has each of the following functions (f42-1) to (f42-2).

(f42-1) A primary computation function to execute the primary computation processing on the basis of each ciphertext (each encrypted data) to generate a primary computation result (e.g., $X_1$ and $X_2$) corresponding to data obtained by encrypting a computation result of an expression that has added or subtracted each numerical value. For example, each encrypted data $C_i$ (i=1, 2, . . . , and k) is generated when k numerical values $m_1, m_2, \ldots,$ and $m_k$ in a set of integers equal to or more than 0 and less than N are encrypted by the encryption key (e.g., a and sv).

(f42-2) A tertiary computation function to execute the tertiary computation processing on the basis of a secondary computation result (e.g., $Y_1$ and $Y_2$) and the tertiary computation key (e.g., v) to generate a tertiary computation result (=FR-z) when the secondary computation result in which the primary computation result (e.g., $X_1$ and $X_2$) is randomized is generated by the computation assist device 50 (e.g., $a^{-1}$ is a value which satisfies a mod $N^2$. R is the product of β random numbers randomly selected from a set $\{1, \ldots,$ and L$\}$. There is a relation $L^\beta < N/2$. z is a random number selected from a set $\{0, 1, \ldots,$ and J$\}$. The probability that R<J is sufficiently low.). A tertiary computation result W (=FR-z) corresponds to data in which a computation result of Expression F that has performed an addition-subtraction is kept secret by random numbers (e.g., R and z) alone.

The decision unit 43 decides whether Expression F (F will be described later) is positive or negative on the basis of the tertiary computation result. Specifically, the decision unit 43 decides the magnitude relation between the minuend and the subtrahend in Expression F on the basis of the tertiary computation result W.

The communication unit 44 is a communication interface to communicate with the other devices 10 to 30, and 50, and has, for example, a function to send the primary computation result in the temporary data storage unit 41 to the computation assist device 50 under the control of the control unit 45.

Figure 7:
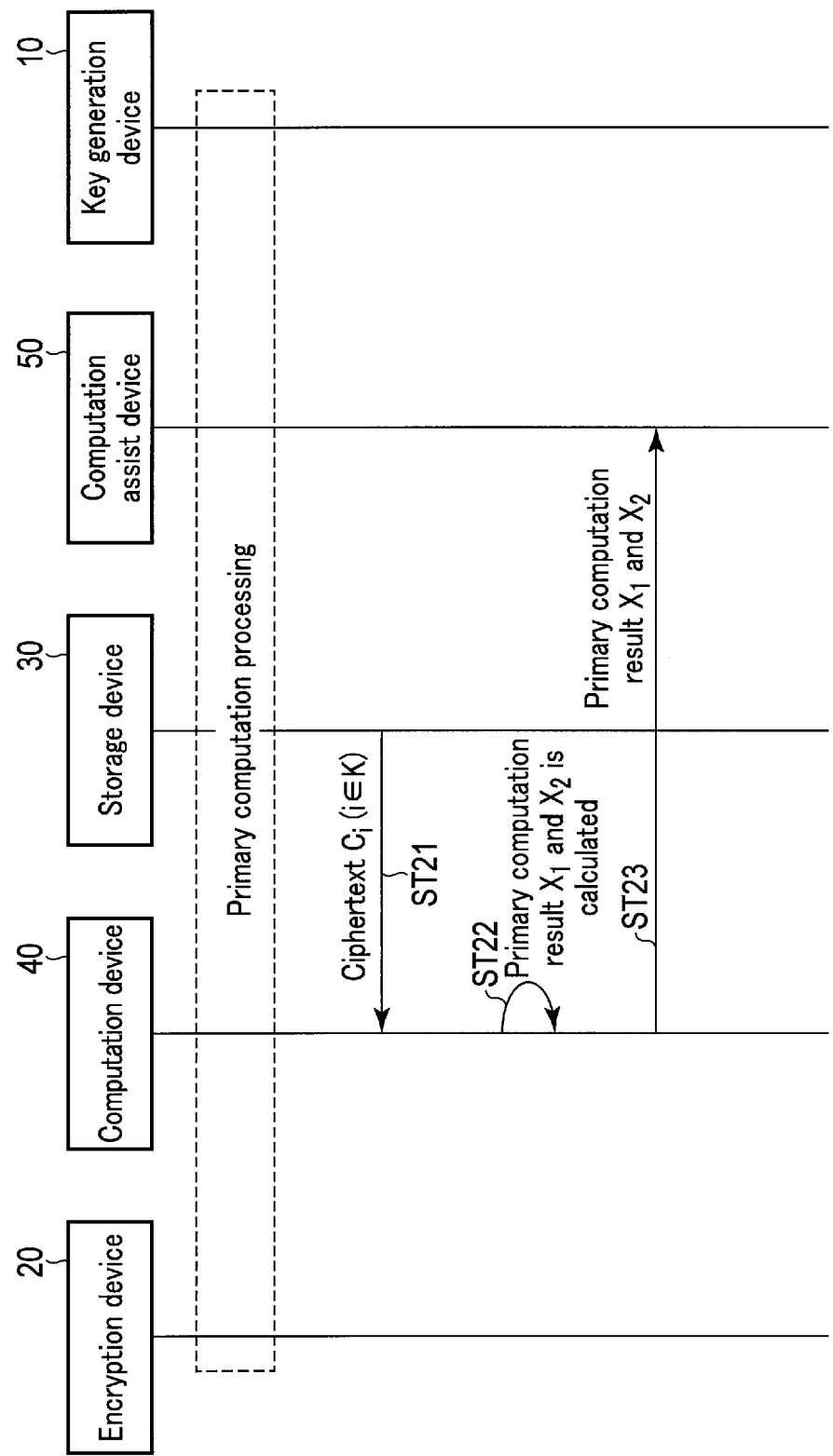
FIG. 7 is a sequence diagram illustrating the operation of primary computation processing according to the same embodiment.
Figure 9:
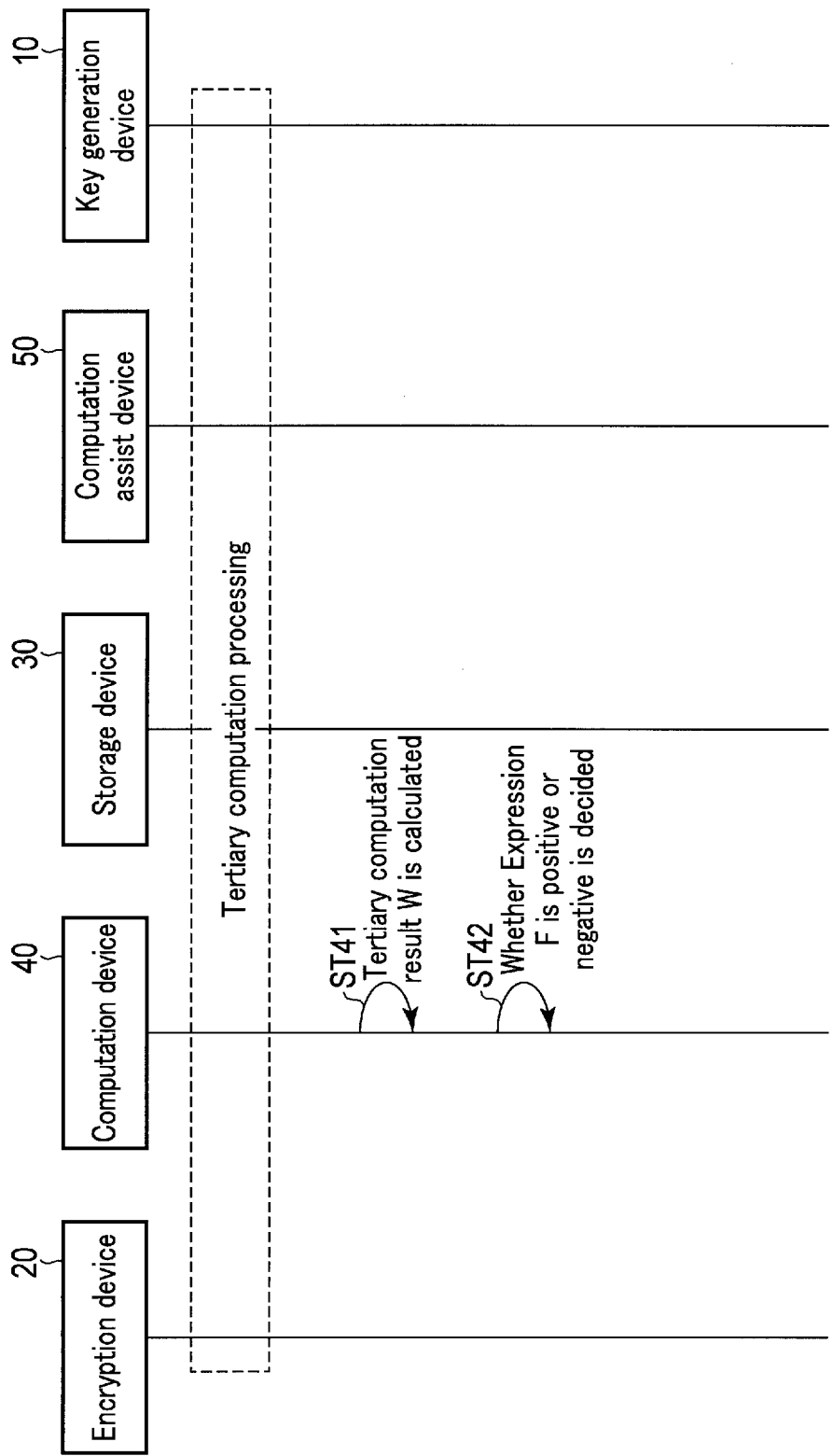
FIG. 9 is a sequence diagram illustrating the operation of tertiary computation processing according to the same embodiment.

The control unit 45 has a function to control each of the units 41 to 44, and 46 to perform the operation shown in FIG. 7 and FIG. 9.

The tertiary computation key storage unit 46 is a storage device to store the tertiary computation key.

The computation assist device 50 comprises a secondary computation processing parameter generation unit 51, a temporary data storage unit 52, a calculation unit 53, a secondary computation key storage unit 54, a communication unit 55, and a control unit 56.

Here, the secondary computation processing parameter generation unit 51 generates a secondary computation processing parameter. The secondary computation processing parameter generation unit 51 has, for example, a random number generation function to generate random numbers. The random number generation function to generate, for example, the random numbers R and z (e.g., R is the product of β random numbers randomly selected from a set $\{1, \ldots,$ and L$\}$. There is a relation $L^\beta < N/2$. z is a random number selected from a set $\{0, 1, \ldots,$ and J$\}$. The probability that R<J is sufficiently low.}.

The temporary data storage unit 52 is a storage device to store temporary data which is being processed and which is a processing result in the secondary computation processing parameter generation unit 51 and the calculation unit 53.

The calculation unit 53 calculates the secondary computation result. Specifically, the calculation unit 53 generates the secondary computation result (e.g., $Y_1$ and $Y_2$) by executing the secondary computation processing on the basis of the primary computation result (e.g., $X_1$ and $X_2$), the secondary computation key (e.g., $a^{-1}$ and s), and the random numbers (e.g., R and z).

The secondary computation key storage unit 54 is a storage device to store the secondary computation key. For example, the secondary computation key storage unit 54 stores the secondary computation key (e.g., $a^{-1}$ and s) when the computation device 40 generates the primary computation result (e.g., $X_1$ and $X_2$) on the basis of each encrypted data $C_i$ (i=1, 2, . . . , and k) after the client terminals (10 and 20) have generated each encrypted data $C_i$ (i=1, 2, . . . , and k) (e.g., $a^{-1}$ is a value which satisfies a mod $N^2$.). The client terminals (10 and 20) encrypt each of k numerical values $m_1, m_2, \ldots,$ and $m_k$ in a set of integers equal to or more than 0 and less than N by the encryption key (e.g., a and sv) to generate each encrypted data $C_i$ (i=1, 2, . . . , and k). On the basis of each encrypted data $C_i$ (1=1, 2, . . . , and k), the computation device 40 generates the primary computation result (e.g., $X_1$ and $X_2$) corresponding to data in which a computation result of Expression F that has added and subtracted each of the numerical values is encrypted.

The communication unit 55 is a communication interface to communicate with the other devices 10 to 40, and has, for example, a function to send the secondary computation result in the temporary data storage unit 52 to the computation device 40 under the control of the control unit 56.

Figure 8:
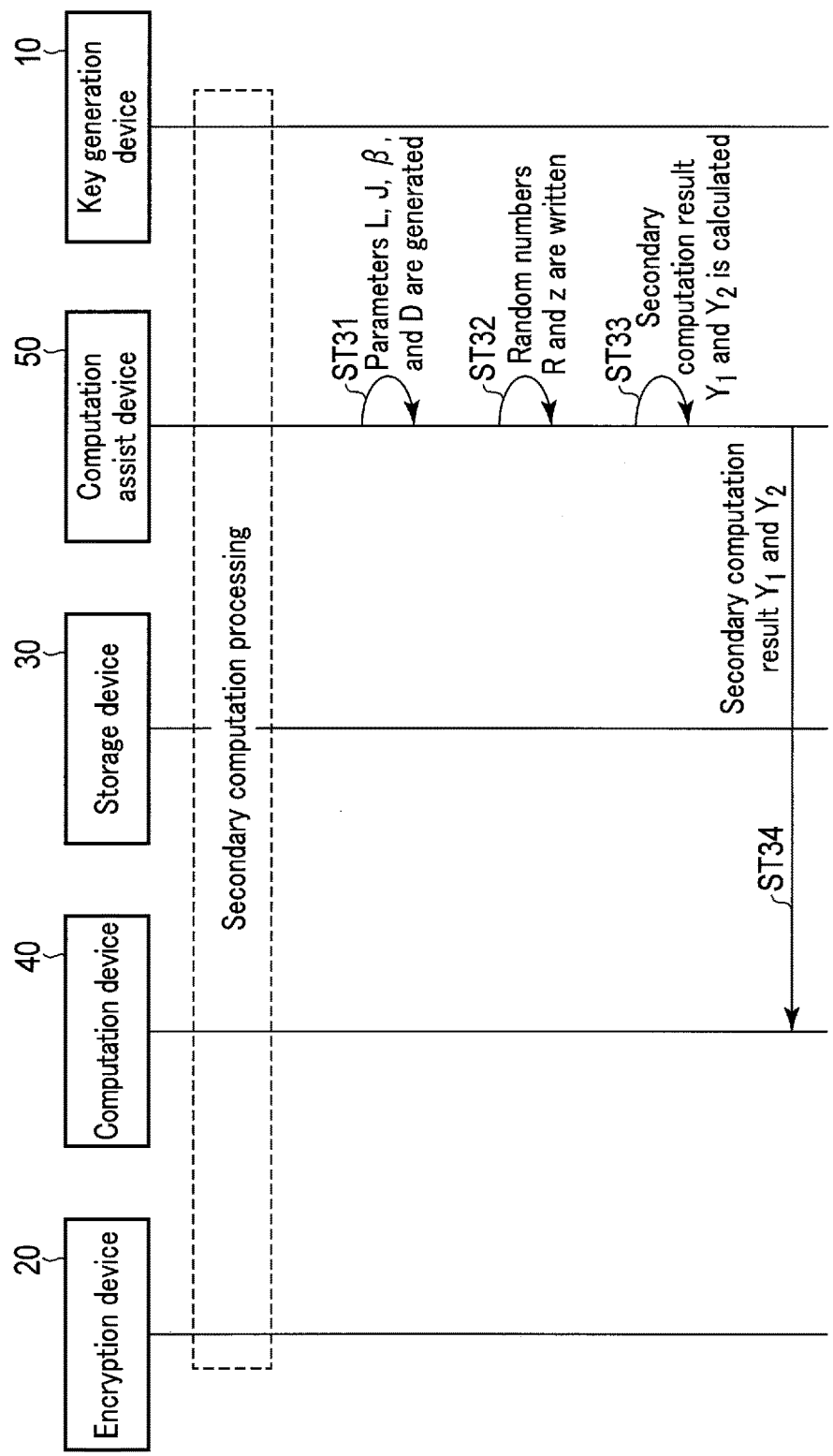
FIG. 8 is a sequence diagram illustrating the operation of secondary computation processing according to the same embodiment.

The control unit 56 has a function to control each of the units 51 to 55 to perform the operation shown in FIG. 8.

Next, the key generation processing, the encryption processing, the primary computation processing, the secondary computation processing, and the tertiary computation processing are each described in detail.

[0. Key Generation Processing]

The key generation processing is executed by the key generation device 10 as shown in FIG. 5 and steps ST1 to ST7 below.

Initially, the parameter generation unit 13 of the key generation device 10 generates or externally obtains prime numbers p and q such that p'=(p−1)/2 and q'=(q−1)/2 may be prime numbers (ST1). Here, the parameter generation unit 13 generates or externally obtains prime numbers p and q such that the number of bits of a composite number N=pq may be λ or may be a value higher than λ on the basis of the security parameter λ previously stored in the key generation parameter storage unit 11.

The parameter generation unit 13 then calculates parameters pp'qq' and N, and writes the parameters pp'qq' and N into the temporary data storage unit 12 (ST2).

The parameter generation unit 13 then generates a multiplicative group G of order pp'qq', randomly selects an element g of G from G, and writes the selected element g into the temporary data storage unit 12 (ST3). To generate the multiplicative group G of order pp'qq', it is only necessary to randomly select the element of $Z_{N^2}*$ from $Z_{N^2}*$, and use, as g, a value obtained by squaring the selected element. Here, $Z_{N^2}*$ is a set $(=(Z/N^2Z)*)$ of integers relatively prime to $Z_{N^2}$ and $N^2$, and may be called a multiplicative group $Z_{N^2}*$ for the composite number $N^2$. $Z_{N^2}$ is a set $(=(Z/N^2Z))$ of integers equal to or more than 0 and less than $N^2$.

[Expression 1]

In the present specification, $Z_{N^2}*$ represents $Z^*_{N^2}$.

The key generation unit 14 then acquires the parameters pp'qq' and N stored in the temporary data storage unit 12, and randomly selects parts a, s, and v of the respective keys from a set {1, . . . , and pp'qq'} (ST4).

The key generation unit 14 then calculates the value of $a^{-1}$ which satisfies $a \cdot a^{-1}$ mod $N^2$=1 and the value of $g^{sv}$, and writes the encryption keys a, $g^{sv}$, g, and N, the secondary computation keys $a^{-1}$, s, and N, and the tertiary computation keys v and N into the temporary data storage unit 12. Here, the communication unit 15 sends the encryption keys a, $g^{sv}$, g, and N in the temporary data storage unit 12 to the encryption device 20 under the control of the control unit 16 (ST5). The encryption keys a, $g^{sv}$, g, and N are stored in the encryption key storage unit 24 of the encryption device 20.

The communication unit 15 then sends the secondary computation keys $a^{-1}$ and s, and N in the temporary data storage unit 12 to the computation assist device 50 under the control of the control unit 16 (ST6). The secondary computation keys $a^{-1}$ and s, and N are stored in the secondary computation key storage unit 54 by the control unit 56 of the computation assist device 50.

Furthermore, the communication unit 15 sends the tertiary computation keys v and N in the temporary data storage unit 12 to the computation device 40 under the control of the control unit 16 (ST7). The tertiary computation keys v and N are stored in the tertiary computation key storage unit 46 by the control unit 45 of the computation device 40. The encryption keys may be a, sv, g, and N or may be a, s, v, g, and N.

In steps ST5, ST6, and ST7, the communication unit 15 may also send $N^2$ to the encryption device 20, the computation assist device 50, and the computation device 40. In this case, the parameter generation unit 13 also writes $N^2$ into the temporary data storage unit 12 in step ST2. g, N, and $N^2$ may be open to each of the devices as open parameters without being included in the encryption keys, the secondary computation keys, and the tertiary computation keys. In short, the encryption keys include a, s, and v (or a and sv). The secondary computation keys include $a^{-1}$ and s. The tertiary computation key includes v.

These also apply to other embodiments described later.

In this way, the key generation processing is completed. Although a notation in which G is assumed to be a multiplicative group is used in the present specification, the invention is not limited to this, and a notation in which G is assumed to be an additive group may also be used.

[1. Encryption Processing]

The encryption processing described below is processing for generating a ciphertext (encrypted data).

The encryption processing is executed by the encryption device 20 as shown in FIG. 6 and steps ST11 to ST14 below. An example in which the encryption device 20 encrypts k (k is a natural number) plaintexts (numerical data to be encrypted) $m_1, \ldots,$ and $m_k$ is described. Each plaintext $m_i$ is an element of $Z_N$. $Z_N$ is a set $(=(Z/NZ))$ of integers equal to or more than 0 and less than N.

Initially, the encryption parameter generation unit 21 of the encryption device 20 randomly selects k random numbers $r_1, \ldots,$ and $r_k$ from $Z_{N^2}*$ (ST11). The encryption parameter generation unit 21 then writes the generated random numbers $r_1, \ldots,$ and $r_k$ into the temporary data storage unit 22 (ST12). The ciphertext generation unit 23 encrypts the plaintexts $m_1, \ldots,$ and $m_k$ in accordance with the following expression by using the random numbers $r_1, \ldots,$ and $r_k$ acquired from the temporary data storage unit 22 and the encryption keys a, $g^{sv}$, g, and N stored in the encryption key storage unit 24 (ST13).

$$C_i = (C_{i,1}, C_{i,2}) \quad (i=1, \ldots, k)$$

$$C_{i,1} = g^{r_i} \bmod N^2$$

$$C_{i,2} = g^{svr_i}(1+am_iN) \bmod N^2. \quad \text{[Expression 2]}$$

The ciphertext generation unit 23 writes the generated ciphertext $C_i$ (i=1, . . . , and k) into the temporary data storage unit 22. The communication unit 25 sends the ciphertext $C_i$ (i=1, . . . , and k) in the temporary data storage unit 22 to the storage device 30 under the control of the control unit 26 (ST14).

The encryption key a may be generated by the key generation device 10 as described above or may be generated by the encryption device 20. In the latter case, the key generation device 10 sends the encryption keys $g^{sv}$, g, and N to the encryption device 20 in step ST5. In step ST11, the encryption parameter generation unit 21 of the encryption device 20 generates the encryption key a, calculates the value of $a^{-1}$, and sends the secondary computation key $a^{-1}$ to the computation assist device 50. When the encryption device 20 does not know the value of pp'qq', the encryption key a has only to be randomly selected from $Z_{N^2}*$.

In this way, the encryption processing is completed.

[2. Primary Computation Processing]

The primary computation processing described below is processing for adding and subtracting the ciphertext (encrypted data).

The primary computation processing is executed by the computation device 40 as shown in FIG. 7 and steps ST21 to ST23 below. An example in which the computation device 40 decides whether Expression F is positive or negative (in the later-described tertiary computation processing) is described.

$$F = \sum_{i \in K} n_i m_i \quad \text{[Expression 3]}$$

wherein $n_i$ is a given integer. K is a set of indices i necessary for the calculation of Expression F. For example, when $F=2m_1-m_2$, $n_1=2$, $n_2=-1$, $K=\{1, 2\}$. When the magnitude relation between a minuend $m_a$ and the subtrahend $m_b$ in Expression F of the addition-subtraction is to be decided, for example, $F=m_a-m_b=3m_2-4m_3+m_5$, so that $n2=3$, $n3=-4$, $n5=1$, $K=\{2, 3, 5\}$. Here, the minuend $m_a$ is $3m_2+m_5$, and the subtrahend $m_b$ is $4m_3$. When the magnitude relation between the numerical values a and b is to be decided, it is only necessary that $F=m_a-m_b=m_1-m_2$, so that $n_1=1$, $n_2=-1$, $K=\{1,2\}$.

The communication unit 44 of the computation device 40 acquires the ciphertext $C_i$ (i∈K) necessary for the calculation of Expression F from the storage device 30, and stores the ciphertext $C_i$ (i∈K) in the temporary data storage unit 41 under the control of the control unit 45 (ST21). The calculation unit 42 then calculates the primary computation result $X_1$ and $X_2$ in accordance with the following expression by using the ciphertext $C_i$ (i∈K) acquired from the temporary data storage unit 41 (ST22).

$$X_1 = \prod_{i \in K} C_{i,1}^{n_i} \bmod N^2,$$

$$X_2 = \prod_{i \in K} C_{i,2}^{n_i} \bmod N^2. \quad \text{[Expression 4]}$$

The calculation unit 42 writes the generated primary computation result $X_1$ and $X_2$ into the temporary data storage unit 41. The communication unit 44 sends the primary computation result $X_1$ and $X_2$ in the temporary data storage unit 41 to the computation assist device 50 under the control of the control unit 45 (ST23).

In this way, the primary computation processing is completed.

[3. Secondary Computation Processing]

The secondary computation processing described below is processing for randomizing the added and subtracted ciphertext (encrypted data). The secondary computation processing is executed by the computation assist device 50 as shown in FIG. 8 and steps ST31 to ST34 below.

The secondary computation processing parameter generation unit 51 of the computation assist device 50 generates parameters L, J, β, and D, and writes the parameters L, J, β, and D into the temporary data storage unit 52 (ST31). An index to select these parameters L, J, β, and D will be described later. The parameters L, J, β, and D may be externally provided. In this case, in step ST31, the secondary computation processing parameter generation unit 51 writes the externally acquired parameters L, J, β, and D into the temporary data storage unit 52.

The secondary computation processing parameter generation unit 51 then randomly selects β random numbers $r'_i$ (i=0, . . . , and β-1) from a set $\{1, \ldots, \text{and } L\}$. Here, β may be β=1 or may be β≥2. This also applies to other embodiments and modifications. A random number z is randomly selected from the set $\{0, 1, \ldots, \text{and } J\}$. The secondary computation processing parameter generation unit 51 then calculates a random number R indicated in the following expression, and writes the random numbers R and z into the temporary data storage unit 52 (ST32).

$$R = \prod_{i=0}^{\beta-1} r'_i \quad \text{[Expression 5]}$$

The calculation unit 53 then calculates the secondary computation result $Y_1$ and $Y_2$ in accordance with the following expression by using the secondary computation keys $a^{-1}$, s, and N stored in the secondary computation key storage unit 54, and the primary computation result $X_1$ and $X_2$ and the random numbers R and z acquired from the temporary data storage unit 52 (ST33).

$$Y_1 = X_1^{a^{-1}Rs} \bmod N^2,$$

$$Y_2 = X_2^{a^{-1}R}(1-zN) \bmod N^2. \quad \text{[Expression 6]}$$

The calculation unit 53 writes the generated secondary computation result $Y_1$ and $Y_2$ into the temporary data storage unit 52. The communication unit 55 sends the secondary computation result $Y_1$ and $Y_2$ in the temporary data storage unit 52 to the computation device 40 under the control of the control unit 56 (ST34).

Here, the index to select each parameter is described. The maximum value of an absolute value which makes it possible to decide the positive or negative is D. That is, suppose that it is necessary to decide that F is positive when 0<F<D and that F is negative when −D<F<0. In this instance, the secondary computation processing parameter generation unit 51 selects β random numbers $r'_i$ to satisfy the following expression.

$$L^\beta D < N/2 \quad \text{[Expression 7]}$$

The secondary computation processing parameter generation unit 51 selects J so that the probability that R<J may be sufficiently low when R which is the product of β random numbers $r'_i$ is selected as described above.

In this way, the secondary computation processing is completed.

[4. Tertiary Computation Processing]

The tertiary computation processing described below is processing for deciding the magnitude relation between the minuend and the subtrahend in the expression of the addition-subtraction from the randomized and added and subtracted ciphertext (encrypted data).

The tertiary computation processing is executed by the computation device 40 as shown in FIG. 9 and steps ST41 to ST42 below.

The calculation unit 42 of the computation device 40 calculates W' in accordance with the following expression by using the tertiary computation keys v and N stored in the tertiary computation key storage unit 46 and the secondary computation result $Y_1$ and $Y_2$ acquired from the temporary data storage unit 41.

$$W' = \left(\frac{Y_2}{Y_1^v} \bmod N^2\right) - 1. \quad \text{[Expression 8]}$$

When W' is not a multiple of N, the following calculations are not performed, and the tertiary computation processing is finished. Otherwise (when W' is a multiple of N), the calculation unit 42 calculates the tertiary computation result W in accordance with the following expression.

$$W = W'/N \qquad \text{[Expression 9]}$$
$$= FR - z.$$

The decision unit 43 then decides that F is positive if W<N/2, or otherwise decides that F is negative (or 0) (ST42).

When F is represented in the form of $F=M_a-M_b$, it is possible to decide that $M_a>M_b$ if F is positive. It is possible to decide that $M_a \leq M_b$ if F is negative.

In this way, the tertiary computation processing is completed.

In step ST42, the decision unit 43 may decide that F=0 if $-J \leq W \leq 0$. In this case, the decision unit 43 decides that F is negative if $-N/2 < W < -J$. This also applies to other embodiments and modifications.

Here, an example in which $F=3m_2-4m_3+m_5$ is given to show that W=FR-z. The primary computation result $X_1$ and $X_2$, the secondary computation result $Y_1$ and $Y_2$, and the tertiary computation result W are respectively represented as follows.

$$X_1 = C_{2,1}^3 C_{3,1}^{-4} C_{5,1} \qquad \text{[Expression 10]}$$
$$= g^{r_2} g^{-4r_3} g^{r_5}$$
$$= g^{3r_2-4r_3+r_5},$$

$$X_2 = C_{2,2}^3 C_{3,2}^{-4} C_{5,2}$$
$$= \{g^{r_2 sv}(1+am_2 N)\}^3 \{g^{r_3 sv}(1+am_3 N)\}^{-4} \{g^{r_5 sv}(1+am_5 N)\}$$
$$= \{g^{(3r_2-4r_3+r_5)sv}(1+3m_2 aN)(1-4m_3 aN)(1+m_5 aN)\}$$
$$= g^{(3r_2-4r_3+r_5)sv} \{1+(3m_2-4m_3+m_5)aN\}.$$

$$Y_1 = g^{(3r_2-4r_3+r_5)a^{-1} Rs}, \qquad \text{[Expression 11]}$$

$$Y_2 = g^{(3r_2-4r_3+r_5)a^{-1} Rsv} \{1+(3m_2-4m_3+m_5)aN\}^{a^{-1}R} (1-zN)$$
$$= g^{(3r_2-4r_3+r_5)a^{-1} Rsv} \{1+(3m_2-4m_3+m_5)RN\}(1-zN)$$
$$= g^{(3r_2-4r_3+r_5)a^{-1} Rsv} \{1+(3m_2-4m_3+m_5)RN - zN\}.$$

$$W = \left\{\left(\frac{g^{(3r_2-4r_3+r_5)a^{-1} Rsv}\{1+(3m_2-4m_3+m_5)RN - zN\}}{g^{(3r_2-4r_3+r_5)a^{-1} Rsv}} \bmod N^2\right) - 1\right\}/N \qquad \text{[Expression 12]}$$
$$= \{(1+(3m_2-4m_3+m_5)RN - zN) - 1\}/N$$
$$= \{(3m_2-4m_3+m_5)RN - zN\}/N$$
$$= (3m_2-4m_3+m_5)R - z$$
$$= FR - z.$$

In the tertiary computation result W, W=FR−z, and z is subtracted from FR. However, if the value of R is set as described above, the decision unit 43 can correctly decide whether F is positive or negative in step ST42 without being affected by the value of the random number z.

In the example described above, $F=M_a-M_b=3m_2-4m_3+m_5$, so that if, for example, the minuend $M_a=3m_2+m_5$ and the subtrahend $M_b=4m_3$, the magnitude relation between the minuend ($3m_2+m_5$) and the subtrahend ($4m_3$) can be decided. If, for example, the minuend $M_a=3m_2$ and the subtrahend $M_b=4m_3-m_5$, the magnitude relation between the minuend ($3m_2$) and the subtrahend ($4m_3-m_5$) can be also decided.

As described above, according to the present embodiment, the computation device 40 generates the primary computation result corresponding to data in which the computation result of the expression that has added and subtracted each of the numerical values is encrypted, on the basis of each encrypted data. The computation assist device 50 generates a secondary computation result in which the primary computation result is randomized, on the basis of the primary computation result, the secondary computation key, and the random numbers. On the basis of the secondary computation result and the tertiary computation key, the computation device 40 generates a tertiary computation result corresponding to data in which the computation result of the expression that has performed the addition-subtraction is kept secret by the random numbers alone. On the basis of the tertiary computation result, the computation device 40 decides the magnitude relation between the minuend and the subtrahend in the expression.

In this way, each of the numerical values can be added and subtracted by the use of each encrypted data obtained by encrypting each of the numerical values, and the magnitude relation between the minuend and the subtrahend in the addition-subtraction can be decided.

The decryption keys of the encrypted data E(a) and E(b) and a comparison key (tertiary computation key) can be different from each other, and the encrypted data E(a) and E(b) cannot be decrypted even by the use of the comparison key.

(Modification 1)

The encrypted data computation system according to the present embodiment may have a decryption device (not shown) which decrypts the ciphertext $C_i$. The decryption device comprises a storage unit to store the decryption keys sv, $a^{-1}$, and N (or s, v, $a^{-1}$, and N), and a calculation unit which performs a calculation. The decryption device can decrypt the ciphertext $C_i$ by the following processing. The calculation unit of the decryption device calculates D' in accordance with the following expression by using the decryption keys sv, $a^{-1}$, and N in the storage unit and the ciphertext $C_i$.

$$D'=\{(C_{i,2}/C_{i,1}^{sv})^{a^{-1}} \bmod N^2\}-1. \qquad \text{[Expression 13]}$$

When D' is not a multiple of N, the following calculations are not performed, and the decryption processing is finished. Otherwise (when D' is a multiple of N), the calculation unit of the decryption device calculates a plaintext in accordance with the following expression.

$$m_i=D'/N. \qquad \text{[Expression 14]}$$

Second Embodiment

Although one secondary computation key s and one tertiary computation key v are generated in the example described according to the first embodiment, the invention is not limited to this, and more than one secondary computation key and more than one tertiary computation key may be generated. In the example described below, secondary computation keys $S_{t1}$, $S_{t2}$, ... and tertiary computation keys $v_{t1}$, $v_{t2}$, ... are generated, for example, $S_{t1}$ and $v_{t1}$ are used in one period t1, and $S_{t2}$ and $S_{t2}$ are used in the next period t2.

The key generation processing, the encryption processing, the primary computation processing, the secondary computation processing, and the tertiary computation processing according to the present embodiment are described below. It should be noted that the same parts as those in the first embodiment are described with reference to the same reference signs and that repeated explanations are omitted.

[0. Key Generation Processing]

The processing in steps ST1 to ST3 is the same as that in the first embodiment.

The key generation unit 14 acquires pp'qq' and N stored in the temporary data storage unit 12, and randomly selects a, $s_t$, and $v_T$ from $\{1, \ldots,$ and pp'qq'$\}$ (ST4'). Here, to generalize notation, "t" is used as a superscript of "s", and "T" is used as a superscript of "v", respectively. "$s_t$" signifies the value of "s" used in a period t. "$v_T$" signifies the value of "v" used in a period T. The value of the period t and the value of the period T may be different from each other, or it is also possible that t=T.

In this case, encryption keys are represented as a, $g^\wedge\{s_t v_T\}$, g, and N (note that ^ is a sign indicating power). The secondary computation keys are represented as $a^{-1}$, $s_t$, and N. The tertiary computation keys are represented as $v_T$ and N.

[Expression 15]

In the present specification, $g^\wedge\{s_t v_T\}$ represents $g^{S_t v_T}$.

The key generation unit 14 may generate an encryption key, a secondary computation key, and a tertiary computation key used in each period whenever each period comes. Alternatively, the key generation unit 14 may previously generate encryption keys, secondary computation keys, and tertiary computation keys for more than one period, and hand the keys to the encryption device 20, the computation assist device 50, and the computation device 40, respectively.

[1. Encryption Processing]

The processing in steps ST11, ST12, and ST14 is the same as that in the first embodiment.

The ciphertext generation unit 23 encrypts the plaintexts $m_1, \ldots,$ and $m_k$ in accordance with the following expression by using the random numbers $r_1, \ldots,$ and $r_k$ acquired from the temporary data storage unit 22 and the encryption keys a, $g^\wedge\{s_t v_T\}$, g, and N stored in the encryption key storage unit 24 (ST13').

$C_i = (C_{i,1}, C_{i,2}, C_{i,3}, C_{i,4})$ $(i=1, \ldots, k)$, $C_{i,1} = g^{r_i} \bmod N^2$, $C_{i,2} = g^{S_t v_T t_i}(1 + a m_i N) \bmod N^2$, $C_{i,3} = t$, $C_{i,4} = T.$ [Expression 16]

[2. Primary Computation Processing]

The processing in step ST21 is the same as that in the first embodiment.

The calculation unit 42 calculates a primary computation result $\{X_1(t, T), X_3, X_4\}$, $X_2$ in accordance with the following expression for each (t, T) by using the ciphertext $C_i$ (i∈K) acquired from the temporary data storage unit 41 (ST22').

$X_1(t, T) = \prod_{i \in K \text{ and } (C_{i,3}, C_{i,4}) = (t,T)} C_{i,1}^{n_i} \bmod N^2$, [Expression 17]

$X_2 = \prod_{i \in K} C_{i,2}^{n_i} \bmod N^2$,

-continued $X_3 = t$, $X_4 = T.$

Here, $X_1(t, T)$ is calculated by the use of one or more $C_i$ in which $(C_{i,3}, C_{i,4})$ is the same. For example, when $C_i$ of (t, T)=(1, 1) and $C_i$ of (t, T)=(2, 1) exist, $X_1(1, 1)$ and $X_1(2, 1)$ are calculated, respectively. A set of $X_1(t, T)$, $X_3$, $X_4$ calculated for each (t, T) is represented as $\{X_1(t, T), X_3, X_4\}$.

The calculation unit 42 writes the generated primary computation result $\{X_1(t, T), X_3, X_4\}$, $X_2$ into the temporary data storage unit 41. The communication unit 44 sends the primary computation result $\{X_1(t, T), X_3, X_4\}$, $X_2$ in the temporary data storage unit 41 to the computation assist device 50 under the control of the control unit 45 (ST23').

[3. Secondary Computation Processing]

The processing in step ST31 and step ST32 is the same as that in the first embodiment.

The calculation unit 53 calculates $Y_1(t, T)$ in accordance with the following expression for each (t, T) by using the secondary computation keys $S_t$ and N stored in the secondary computation key storage unit 54 and the primary computation result $\{X_1(t, T)\}$ acquired from the temporary data storage unit 52, and writes $Y_1(t, T)$ in the temporary data storage unit 52.

$Y_1(t,T) = X_1(t,T)^{S_t} \bmod N^2.$ [Expression 18]

The calculation unit 53 then calculates the secondary computation result $\{Y_1(T), Y_3\}$, $Y_2$ in accordance with the following expression for each T by using the secondary computation keys $a^{-1}$ and N stored in the secondary computation key storage unit 54, $Y_1(t, T)$ acquired from the temporary data storage unit 52, and the primary computation result $X_2$, and the random numbers R and z (ST33').

$Y_1(T) = \Pi Y(i,T)^{a^{-1} R} \bmod N^2$, $i \in \{X_3\}$ and $Y(i,T)$ is exist $Y_2 = X_2^{a^{-1} R}(1 - zN) \bmod N^2$, $Y_3 = T.$ [Expression 19]

Here, $Y_1(t)$ is calculated by the use of one or more $X_1(t, T)$ in which $X_4$ is the same. For example, when $X_1(t, T)$ of (t, T)=(1, 1) and $X_1(t, T)$ of (t, T)=(1, 2) exist, $Y_1(1)$ and $Y_2(2)$ are calculated, respectively. A set of $Y_1(T)$, $Y_3$ calculated for T is represented as $\{Y_1(T), Y_3\}$.

The calculation unit 53 writes the generated secondary computation result $\{Y_1(T), Y_3\}$, $Y_2$ into the temporary data storage unit 52. The communication unit 55 sends the secondary computation result $\{Y_1(T), Y_3\}$, $Y_2$ in the temporary data storage unit 52 to the computation device 40 under the control of the control unit 56 (ST34').

[4. Tertiary Computation Processing]

The processing in step ST42 is the same as that in the first embodiment.

The calculation unit 42 calculates W' in accordance with the following expression by using the tertiary computation keys $v_T$ and N stored in the tertiary computation key storage unit 46 and the secondary computation result $\{Y_1(T), Y_3\}$, $Y_2$ acquired from the temporary data storage unit 41.

$W' = \left( \dfrac{Y_2}{\prod_{i \in \{Y_3\}} Y_1(i)^{v_i}} \bmod N^2 \right) - 1.$ [Expression 20]

When W' is not a multiple of N, the following calculations are not performed, and the tertiary computation processing is finished. Otherwise (when W' is a multiple of N), the calculation unit 42 calculates the tertiary computation result W in accordance with the following expression (ST41').

$$W = W'/N \qquad \text{[Expression 21]}$$
$$= FR - z.$$

As in the first embodiment, when the expression is represented in the form of $F=M_a-M_b$, it is possible to decide that $M_a > M_b$ if Expression F is positive. It is possible to decide that $M_a \le M_b$ if Expression F is negative. In this way, the tertiary computation processing is completed.

Next, the primary computation processing, the secondary computation processing, and the tertiary computation processing above are described by way of example. Specifically, an example in which $F=m_1-m_2+m_3+m_4+m_5$ and ciphertexts $c_1$, $c_2$, $c_3$, $c_4$, and $c_5$ shown in the following expression are stored in the storage device 30 is given to show that $W=FR-z$.

$$c_1 = (C_{1,1}, C_{1,2}, 1, 1)$$
$$c_2 = (C_{2,1}, C_{2,2}, 1, 1)$$
$$c_3 = (C_{3,1}, C_{3,2}, 1, 2)$$
$$c_4 = (C_{4,1}, C_{4,2}, 2, 1)$$
$$c_5 = (C_{5,1}, C_{5,2}, 2, 2) \qquad \text{[Expression 22]}$$

In this instance, the computation expression of the primary computation result $\{X_1(t, T), X_3, X_4\}$, $X_2$ is represented as follows.

$$X_1(1,1) = C_{1,1} C_{2,1}^{-1} \bmod N^2,$$
$$X_1(1,2) = C_{3,1} \bmod N^2,$$
$$X_1(2,1) = C_{4,1} \bmod N^2,$$
$$X_1(2,2) = C_{5,1} \bmod N^2,$$
$$X_2 = C_{1,2} C_{2,2}^{-1} C_{3,2} C_{4,2} C_{5,2} \bmod N^2. \qquad \text{[Expression 23]}$$

The computation expressions of $X_3$ and $X_4$ are not shown.
The computation expression of the secondary computation result $\{Y_1(T), Y_3\}$, $Y_2$ is represented as follows.

$$Y_1(1) = (X_1(1,1)^{s_1} X_1(2,1)^{s_2})^{a^{-1}R} \bmod N^2, \qquad \text{[Expression 24]}$$
$$Y_1(2) = (X_1(1,2)^{s_1} X_1(2,2)^{s_2})^{a^{-1}R} \bmod N^2,$$
$$Y_2 = X_2^{a^{-1}R}(1 - zN) \bmod N^2.$$

The computation expression of $Y_3$ is not shown.
The computation expression of the tertiary computation result W is represented as follows.

$$W = \left\{ \left( \frac{X_2^{a^{-1}R}(1-zN)}{Y_1(1)^{v_1} Y_1(2)^{v_2}} \bmod N^2 \right) - 1 \right\} / N \qquad \text{[Expression 25]}$$

$$= (m_1 - m_2 + m_3 + m_4 + m_5)R - z$$
$$= FR - z.$$

In the example described above, $F=M_a-M_b=m_1-m_2+m_3+m_4+m_5$, so that, for example, it is possible that $M_a=m_1+m_3+m_4+m_5$ and $M_b=m_2$, and the magnitude comparison between $m_1+m_3+m_4+m_5$ and $m_2$ can be made.

For example, it is also possible to consider that $M_a=m_1+m_3+m_4$ and $M_b=m_2-m_5$, so that it is also possible to consider that the magnitude comparison between $m_1+m_3+m_4$ and $m_2-m_5$ is made.

As described above, according to the present embodiment, the secondary computation keys $S_{t1}$ and $S_{t2}$ and the tertiary computation keys $v_{t1}$ and $v_{t2}$ are respectively generated in accordance with the periods t1 and t2. Owing to this configuration, in addition to the advantageous effects according to the first embodiment, it is possible to inhibit the damage from key leakage, and decide the magnitude relation of the respective encrypted numerical values by using the ciphertext $E^{(t1)}$ (a) generated in the period t1 and the ciphertext $E^{(t2)}$ (b) generated in the period t2.

In addition, generally, it is desirable to periodically update the comparison key from the perspective of inhibiting the damage from key leakage. However, the problem in the conventional magnitude relation deciding method is that the magnitudes of the values of numerical values a and b cannot be decided by the use of encrypted data $E^{(t1)}$ (a) generated before the update of the comparison key and encrypted data $E^{(t2)}$ (b) generated after the update of the comparison key.

In contrast, according to the present embodiment, as described above, it is possible to decide the magnitude relation of the respective encrypted numerical values by using the ciphertext $E^{(t1)}$ (a) generated in the period t1 and the ciphertext $E^{(t2)}$ (b) generated in the period t2.

(Modification 2)

The encrypted data computation system according to the present embodiment may have a decryption device (not shown) which decrypts the ciphertext $C_i$. The decryption device comprises a storage unit to store the decryption keys $s_t v_T$, $a^{-1}$, and N (or $s_t$, $v_T$, $a^{-1}$, and N), and a calculation unit which performs a calculation. The decryption device can decrypt the ciphertext $C_i$ by the following processing. The calculation unit of the decryption device calculates D' in accordance with the following expression by using the decryption keys $s_t v_T$, $a^{-1}$, and N in the storage unit and the ciphertext $C_i$.

$$D' = \{(C_{i,2}/C_{i,1}^{S_t v_T})^{a^{-1}} \bmod N^2\} - 1. \qquad \text{[Expression 26]}$$

When D' is not a multiple of N, the following calculations are not performed, and the decryption processing is finished. Otherwise (when D' is a multiple of N), the calculation unit of the decryption device calculates a plaintext in accordance with the following expression.

$$m_i = D'/N. \qquad \text{[Expression 27]}$$

(Modification 3)

Although $s_i$ and $v_i$ are used in one period t1 in the example described according to the second embodiment, the invention is not limited to this, and different $s_i$ and $v_i$ may be used for each user (for each encryption device 20). In this case, in the second embodiment, $t_i$ has only to be considered as identification information of the user (identification information of the encryption device 20). That is, the key generation processing, the encryption processing, the primary computation processing, the secondary computation processing, and the tertiary computation processing may be the same, and the meaning of the index has only to be changed (i.e., the "period" has only to be replaced by the "user(encryption device 20)".

(Modification 4)

There may be only one secondary computation key $s_i$ and more than one tertiary computation key $v_i$. In this case, in the second embodiment, it is only necessary to replace by $s_1=s_2=\ldots=s$. There may be more than one secondary computation key $s_i$ and only one tertiary computation key $v_i$. In this case, in the second embodiment, it is only necessary to replace by $v_1=v_2=\ldots=v$.

According to at least one of the embodiments described above, the computation device 40 generates a primary computation result corresponding to data in which the computation result of the expression that has added and subtracted each of the numerical values is encrypted, on the basis of each encrypted data. The computation assist device 50 generates a secondary computation result in which the primary computation result is randomized, on the basis of the primary computation result, the secondary computation key, and the random numbers. On the basis of the secondary computation result and the tertiary computation key, the computation device 40 generates a tertiary computation result corresponding to data in which the computation result of the expression that has performed the addition-subtraction is kept secret by random numbers alone. On the basis of the tertiary computation result, the computation device 40 decides the magnitude relation between the minuend and the subtrahend in the expression.

As described above, it is possible to add and subtract each numerical value by using each encrypted data obtained by encrypting each numerical value, and decide the magnitude relation between a minuend and a subtrahend in this addition-subtraction.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to each embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each embodiment on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An encrypted data computation system comprising a client terminal, a computation device, and a computation assist device, the client terminal comprising a numerical value storing circuit configured to store numerical values;

a key generating circuit configured to generate an encryption key to encrypt each of the numerical values, and a secondary computation key and a tertiary computation key that constitute a decryption key corresponding to the encryption key, and an encryption circuit configured to encrypt each of the numerical values on the basis of the encryption key and generating encrypted data, the computation device comprising a tertiary computation key storing circuit configured to store the tertiary computation key, a primary computation circuit configured to execute primary computation processing on the basis of each of the encrypted data and thereby generate a primary computation result corresponding to data in which a computation result of an expression that has added and subtracted each of the numerical values is encrypted, a tertiary computation circuit configured to execute tertiary computation processing on the basis of a secondary computation result and the tertiary computation key when the secondary computation result in which the primary computation result is randomized is generated by the computation assist device, and thereby generate a tertiary computation result corresponding to data in which the computation result of the expression that has performed the addition-subtraction is kept secret by random numbers alone, and a magnitude deciding circuit configured to decide a magnitude relation between a minuend and a subtrahend in the expression on the basis of the tertiary computation result, the computation assist device comprising a secondary computation key storing circuit configured to store the secondary computation key, a random number generating circuit configured to generate the random numbers, and a secondary computation circuit configured to execute secondary computation processing on the basis of the primary computation result, the secondary computation key, and the random numbers and thereby generate the secondary computation result.

2. A client terminal configured to communicate with a computation device and a computation assist device, the client terminal comprising:

a numerical value storing circuit configured to store numerical values;

a key generating circuit configured to generate an encryption key to encrypt each of the numerical values, and a secondary computation key and a tertiary computation key that constitute a decryption key corresponding to the encryption key; and an encryption circuit configured to encrypt each of the numerical values on the basis of the encryption key and generating encrypted data, wherein the computation device executes primary computation processing on the basis of each of the encrypted data and thereby generates a primary computation result corresponding to data in which a computation result of an expression that has added and subtracted each of the numerical values is encrypted, the computation assist device executes secondary computation processing on the basis of the primary computation result, the secondary computation key, and the random numbers and thereby generating a secondary computation result in which the primary computation result is randomized, and the computation device conducts tertiary computation processing on the basis of the secondary computation result and the tertiary computation key to generate a tertiary computation result corresponding to data in which the computation result of the expression that has performed the addition-subtraction is kept secret by the random numbers alone, and decides a magnitude relation between a minuend and a subtrahend in the expression on the basis of the tertiary computation result.

3. A computation device configured to communicate with a client terminal and a computation assist device, the computation device comprising:

a tertiary computation key storing circuit configured to store a tertiary computation key when the client terminal generates an encryption key to encrypt numerical values, and a secondary computation key and the tertiary computation key that constitute a decryption key corresponding to the encryption key, encrypts each of the numerical values on the basis of the encryption key, and generates encrypted data;

a primary computation circuit configured to execute primary computation processing on the basis of each of the encrypted data and thereby generate a primary computation result corresponding to data in which a computation result of an expression that has added and subtracted each of the numerical values is encrypted;

a tertiary computation circuit configured to execute tertiary computation processing on the basis of a secondary computation result and the tertiary computation key when the secondary computation result in which the primary computation result is randomized is generated by the computation assist device, and thereby generate a tertiary computation result corresponding to data in which the computation result of the expression that has performed the addition-subtraction is kept secret by random numbers alone; and a magnitude deciding circuit configured to decide a magnitude relation between a minuend and a subtrahend in the expression on the basis of the tertiary computation result, wherein the computation assist device executes secondary computation processing on the basis of the primary computation result, the secondary computation key, and the random numbers and thereby generating the secondary computation result.

4. The computation device according to claim 3, wherein the primary computation circuit generates the primary computation result $X_1$ and $X_2$ corresponding to data in which a computation result of Expression F that has added and subtracted each of the numerical values is encrypted, on the basis of each of the encrypted data $C_i$ (i=1, 2, . . . , and k) in which k numerical values $m_1$, $m_2$, . . . , and $m_k$ in a set of integers equal to or more than 0 and less than N are encrypted by the encryption key (a and sv), the tertiary computation circuit generates the tertiary computation result W (=FR−z) on the basis of a secondary computation result $Y_1$ and $Y_2$ in which the primary computation result $X_1$ and $X_2$ is randomized by the secondary computation key ($a^{-1}$ and s) and random numbers R and z, and the tertiary computation key (v) (note that $a^{-1}$ is a value which satisfies $a \cdot a^{-1} \mod N^2 = 1$, R is the product of β random numbers randomly selected from a set {1, . . . , and L}, $L^β$<N/2, z is a random number selected from a set {0, 1, . . . , and J}, and the probability that R<J is sufficiently low), and the magnitude deciding circuit decides the magnitude relation between the minuend and the subtrahend in Expression F on the basis of the tertiary computation result W.

5. A computation assist device configured to communicate with a client terminal and a computation device, the computation assist device comprising:

a secondary computation key storing circuit configured to store a secondary computation key in the case where the client terminal stores numerical values, generates an encryption key to encrypt each of the numerical values, and the secondary computation key and a tertiary computation key that constitute a decryption key corresponding to the encryption key, encrypts each of the numerical values on the basis of the encryption key, and generates encrypted data, and then the computation device stores the tertiary computation key, executes primary computation processing on the basis of each of the encrypted data, and thereby generates a primary computation result corresponding to data in which a computation result of an expression that has added and subtracted each of the numerical values is encrypted;

a random number generating circuit configured to generate random numbers; and a secondary computation circuit configured to execute secondary computation processing on the basis of the primary computation result, the secondary computation key, and the random numbers and thereby generate a secondary computation result in which the primary computation result is randomized, wherein the computation device executes tertiary computation processing on the basis of the secondary computation result and the tertiary computation key to generate a tertiary computation result corresponding to data in which the computation result of the expression that has performed the addition-subtraction is kept secret by the random numbers alone, and decides a magnitude relation between a minuend and a subtrahend in the expression on the basis of the tertiary computation result.

6. The computation assist device according to claim 5, wherein the secondary computation key storing circuit stores the secondary computation key ($a^{-1}$ and s) (note that $a^{-1}$ is a value which satisfies $a \cdot a^{-1}$ mod $N^2=1$) in the case where the client terminal encrypts, by the encryption key (a, sv), each of k numerical values $m_1, m_2, \ldots,$ and $m_k$ in a set of integers equal to or more than 0 and less than N to generate each of the encrypted data $C_i$ (i=1, 2, . . . , and k), and then the computation device generates, on the basis of each of the encrypted data $C_i$ (i=1, 2, . . . , and k), the primary computation result $X_1$ and $X_2$ corresponding to data in which a computation result of Expression F that has added and subtracted each of the numerical values is encrypted, the random number generating circuit generates the random numbers R and z (note that R is the product of β random numbers randomly selected from a set $\{1, \ldots,$ and $L\}$, $L^\beta < N/2$, z is a random number selected from a set $\{0, 1, \ldots,$ and $J\}$, and the probability that R<J is sufficiently low), the secondary computation circuit generates the secondary computation result $Y_1$ and $Y_2$ on the basis of the primary computation result $X_1$ and $X_2$, the secondary computation key ($a^{-1}$ and s), and the random numbers R and z, and the computation device generates the tertiary computation result W (=FR−z) on the basis of the secondary computation result $Y_1$ and $Y_2$ and the tertiary computation key (v), and decides the magnitude relation between the minuend and the subtrahend in Expression F on the basis of the tertiary computation result W.

7. A program to be executed by a processor of a client terminal which has a numerical value storing circuit for storing numerical values and which is configured to communicate with a computation device and a computation assist device, the program being stored in a non-transitory computer-readable storage medium (M2'), the program comprising:

a first program code which causes the processor to execute processing to generate an encryption key to encrypt each of the numerical values, and a secondary computation key and a tertiary computation key that constitute a decryption key corresponding to the encryption key; and a second program code which causes the processor to execute processing to encrypt each of the numerical values on the basis of the encryption key and generate encrypted data, wherein the computation device executes primary computation processing on the basis of each of the encrypted data and thereby generates a primary computation result corresponding to data in which a computation result of an expression that has added and subtracted each of the numerical values is encrypted, the computation assist device executes secondary computation processing on the basis of the primary computation result, the secondary computation key, and the random numbers and thereby generating a secondary computation result in which the primary computation result is randomized, and the computation device conducts tertiary computation processing on the basis of the secondary computation result and the tertiary computation key to generate a tertiary computation result corresponding to data in which the computation result of the expression that has performed the addition-subtraction is kept secret by the random numbers alone, and decides a magnitude relation between a minuend and a subtrahend in the expression on the basis of the tertiary computation result.

8. A program to be executed by a processor of a computation device which has a tertiary computation key storing circuit and which is configured to communicate with a client terminal and a computation assist device, the program being stored in a non-transitory computer-readable storage medium (M4'), the program comprising:

a first program code which causes the processor to execute processing to write a tertiary computation key into the tertiary computation key storing circuit in the case where the client terminal generates an encryption key to encrypt numerical values, and a secondary computation key and the tertiary computation key that constitute a decryption key corresponding to the encryption key, encrypts each of the numerical values on the basis of the encryption key, and generates encrypted data;

a second program code which causes the processor to execute primary computation processing on the basis of each of the encrypted data and thereby generate a primary computation result corresponding to data in which a computation result of an expression that has added and subtracted each of the numerical values is encrypted;

a third program code which causes the processor to execute tertiary computation processing on the basis of the secondary computation result and the tertiary computation key to generate a tertiary computation result corresponding to data in which the computation result of the expression that has performed the addition-subtraction is kept secret by random numbers alone when the secondary computation result in which the primary computation result is randomized is generated by the computation assist device; and a fourth program code which causes the processor to execute processing to decide a magnitude relation between a minuend and a subtrahend in the expression on the basis of the tertiary computation result, wherein the computation assist device executes secondary computation processing on the basis of the primary computation result, the secondary computation key, and the random numbers and thereby generates a secondary computation result.

9. A program to be executed by a processor of a computation assist device which has a secondary computation key storing circuit and which is configured to communicate with a client terminal and a computation device, the program being stored in a non-transitory computer-readable storage medium, the program comprising:

a first program code which causes the processor to execute processing to write a secondary computation key into the secondary computation key storing circuit in the case where the client terminal stores numerical values, generates an encryption key to encrypt each of the numerical values, and the secondary computation key and a tertiary computation key that constitute a decryption key corresponding to the encryption key, encrypts each of the numerical values on the basis of the encryption key, and generates encrypted data, and then the computation device stores the tertiary computation key, executes primary computation processing on the basis of each of the encrypted data, and thereby generates a primary computation result corresponding to data in which a computation result of an expression that has added and subtracted each of the numerical values is encrypted;
a second program code which causes the processor to execute processing to generate random numbers; and
a third program code causes the processor to execute processing to execute secondary computation processing on the basis of the primary computation result, the secondary computation key, and the random numbers and thereby generating a secondary computation result in which the primary computation result is randomized,
wherein the computation device executes tertiary computation processing on the basis of the secondary computation result and the tertiary computation key to generate a tertiary computation result corresponding to data in which the computation result of the expression that has performed the addition-subtraction is kept secret by the random numbers alone, and decides a magnitude relation between a minuend and a subtrahend in the expression on the basis of the tertiary computation result.

* * * * *